United States Patent
Van Cleave et al.

(10) Patent No.: US 10,345,099 B2
(45) Date of Patent: Jul. 9, 2019

(54) REFERENCE SYSTEM FOR TRACK ALIGNMENT MACHINES

(71) Applicant: FOCUS POINT SOLUTIONS, San Marcos, CA (US)

(72) Inventors: Larry Van Cleave, Grass Valley, CA (US); Todd Van Cleave, San Marcos, CA (US)

(73) Assignee: FOCUS POINT SOLUTIONS, San Marcos, CA (US)

( * ) Notice: Subject to any disclaimer, the term of this patent is extended or adjusted under 35 U.S.C. 154(b) by 497 days.

(21) Appl. No.: 15/073,410

(22) Filed: Mar. 17, 2016

(65) Prior Publication Data

US 2016/0273172 A1 Sep. 22, 2016

Related U.S. Application Data

(60) Provisional application No. 62/196,471, filed on Jul. 24, 2015, provisional application No. 62/135,039, filed on Mar. 18, 2015.

(51) Int. Cl.
| | | |
|---|---|---|
| *G01B 11/27* | (2006.01) | |
| *B61L 27/00* | (2006.01) | |
| *E01B 35/00* | (2006.01) | |

(52) U.S. Cl.
CPC ............ *G01B 11/272* (2013.01); *B61L 27/00* (2013.01); *E01B 35/00* (2013.01)

(58) Field of Classification Search
CPC .......... E01B 27/17; E01B 35/00; E01B 35/06; E01B 35/10; E01B 2203/16; G01B 11/272

USPC .......................................................... 104/7.2
See application file for complete search history.

(56) References Cited

U.S. PATENT DOCUMENTS

| | | | | | |
|---|---|---|---|---|---|
| 3,604,359 | A | * | 9/1971 | Doorley | E01B 33/02 104/8 |
| 3,706,284 | A | * | 12/1972 | Plasser | E01B 27/17 104/7.2 |
| 3,750,299 | A | * | 8/1973 | Plasser | E01B 27/17 104/7.1 |
| 3,821,932 | A | * | 7/1974 | Theurer | E01B 33/02 104/7.2 |
| 4,027,397 | A | * | 6/1977 | Theurer | B61K 9/08 33/1 Q |
| 4,155,176 | A | * | 5/1979 | Goel | B61K 9/08 33/1 Q |
| 4,531,053 | A | * | 7/1985 | Jaquet | G01D 5/34 104/7.2 |
| 4,535,699 | A | * | 8/1985 | Buhler | E01B 27/17 33/287 |
| 4,538,061 | A | * | 8/1985 | Jaquet | G01B 11/306 104/7.2 |
| 4,680,811 | A | * | 7/1987 | Harper | H04B 10/1141 180/167 |
| 4,724,653 | A | * | 2/1988 | Buhler | E01B 35/06 104/7.2 |
| 5,613,442 | A | * | 3/1997 | Ahola | E01B 35/06 104/2 |

(Continued)

*Primary Examiner* — Zachary L Kuhfuss
(74) *Attorney, Agent, or Firm* — Rimôn, P.C.

(57) ABSTRACT

The present disclosure is in the area of track alignment machines that maintain, adjust, or measure railroad track alignment. In particular, the present disclosure is directed toward reference systems and their use, including receivers, projectors, and combinations of projectors and receivers used to measure track position.

15 Claims, 17 Drawing Sheets

(56) References Cited

U.S. PATENT DOCUMENTS

| | | | | |
|---|---|---|---|---|
| 6,634,112 B2* | 10/2003 | Carr | ............ | G01B 11/24 |
| | | | | 33/1 Q |
| 9,518,845 B2* | 12/2016 | Lichtberger | ............ | E01B 35/00 |
| 9,777,440 B2* | 10/2017 | Carney | ............ | E01B 35/00 |
| 2006/0032063 A1* | 2/2006 | Tomasello | ............ | E01B 27/16 |
| | | | | 33/287 |
| 2015/0083013 A1* | 3/2015 | Carney | ............ | E01B 35/00 |
| | | | | 104/7.1 |
| 2015/0369918 A1* | 12/2015 | Tacke | ............ | G01S 17/06 |
| | | | | 702/150 |
| 2015/0377653 A1* | 12/2015 | Lichtberger | ............ | E01B 35/00 |
| | | | | 356/73 |
| 2016/0273172 A1* | 9/2016 | Van Cleave | ............ | G01B 11/272 |
| 2017/0022672 A1* | 1/2017 | Van Cleave | ............ | E01B 35/10 |

\* cited by examiner

REFERENCE SYSTEM FOR TRACK ALIGNMENT MACHINES

CROSS-REFERENCE TO RELATED APPLICATIONS

This application claims priority to U.S. Provisional Patent Application No. 62/135,039, filed Mar. 18, 2015, and U.S. Provisional Patent Application No. 62/196,471, filed Jul. 24, 2015, the contents of each of which are hereby incorporated by reference in their entirety.

FIELD

The present invention improvements are directed toward railroad track MOW (Maintenance of Way) Equipment. More particularly, the present disclosure is in the area of track alignment machines that maintain, adjust, or measure railroad track alignment. In particular, the present disclosure is directed toward reference systems and their use, including receivers, projectors, and combinations of projectors and receivers used to measure track position.

BACKGROUND

The optical reference systems comprising shadow board reference systems and light mask reference systems have remained largely unchanged for over 30 years. Over this period of time, industry has learned to accept the many challenges and limitations of these current systems including track misalignment do to projector failure or blockage, system interference from reference systems operating in the nearby vicinity or on adjacent track, safety hazards due to high intensity projector light sources interfering with machine operator's vision, etc. The present disclosure addresses these and other needs in the art to provide the efficiency and accuracy of these reference systems and to make the process of track alignment safer and more cost effective.

SUMMARY

In certain embodiments, a track alignment reference system receiver is provided, comprising a photodetector and an optical signal demodulator operably connected with a measurement cell output and a reference cell output. The receiver often further comprises two or more photodetectors, each operably connected with an optical signal receiver. Also often, wherein the two or more photo detectors comprise at least one reference photo cell and at least one measurement photo cell.

The reference cell output is frequently operably connected with a track alignment machine such that a signal communicated from the reference cell output to the track alignment machine can stop an operation of the track alignment machine. In frequent embodiments, a data output is provided operably connected with the optical signal receiver.

In certain frequent embodiments, a track alignment reference system receiver is provided, wherein the optical signal receiver comprises a discrete receiver elements including an amplifier, a filter, an AC/DC converter, logic and/or an infrared receiver IC. Often, the optical signal receiver comprises a demodulation filter operating at a frequency of 2.4 kHz or higher. Also frequently, the frequency is selected from a frequency between the $2^{nd}$ and the $60^{th}$ harmonic of 1.2 Hz. In frequent embodiments, the optical signal receiver comprises a filter operating at a center frequency of about 24 kHz.

Often, each filter of the plurality of filters operates at a different frequency. Also often, each filter of the plurality of filters operates at a different frequency and is operably connected with the reference photo cell, and/or the measurement photo cell. In certain embodiments, one or more filter of the plurality of filters operates at two or more different frequencies and is operably connected with the reference photo cell and/or the measurement photo cell.

In certain embodiments, a plurality of filters are provided, operably connected with the reference photo cell and the measurement photo cell, or operably connected with the reference photo cell or the measurement photo cell.

In certain embodiments, the optical signal receiver comprises an infrared (IR) receiver IC capable of demodulating an optical signal of about 50% duty cycle. Often, the optical signal receiver comprises an infrared receiver IC capable of demodulating an optical signal above about 50% duty cycle. When an IR receiver IC is used, the optical signal receiver often comprises an infrared receiver IC capable of demodulating encoding schemes such as biphase/manchester encoding, amplitude-shift keying, and pulse position modulation.

In certain embodiments, the optical signal receiver is positioned in a housing having a first side, a second side, a top, and a bottom. Often, two or more photodetectors are present in the receiver, and often at least one photodetector is positioned on the first side of the housing, and at least one photodetector is positioned on the second side of the housing. In certain embodiments, three or more photodetectors are present and positioned on the first side of the housing in an array. The housing often comprises a visual indicator for providing an output status indication comprising an indication of an operation or operability of one or more components of the reference system receiver. The visual indication frequently comprises an indication when the photodetector is, and is not, contacted by a signal from a reference projector.

In certain embodiments, two or more of the photodetectors comprise reference photo cells. Also, in certain embodiments, two or more of the photodetectors comprise measurement photo cells.

In certain frequent embodiments, the measurement cell output and the reference cell output communicate output information formatted as a single logic line, multiple data lines, a data transmission system, or a constant current loop. The receiver is often in data communication with the rail alignment machine such that a status of an operation or operability of one or more components of the reference system receiver is transmitted to a control system of the rail alignment machine. The status that is transmitted to the operator of the rail alignment machine, and/or the machine itself in the form of instrumentation, a display, or user interface, is often in the form of a visual indication or cue.

In frequent embodiments, the system comprises a projector, and the projector and the receiver are provided in data communication connection. Often, the system comprises an IR LED projector.

In certain embodiments, methods of monitoring the status of a railway alignment process are provided, comprising: monitoring the status of a reference projector emission signal relative to a reference system receiver comprising a measurement photocell and a reference photocell, wherein a status of the emission signal as not contacting the measurement cell provides a signal to a track alignment machine to halt a track alignment machine operation, and/or wherein a status of the emission signal as not contacting the reference cell provides a signal to a track alignment machine to halt a track alignment machine operation. Often, the methods further comprise simultaneously evaluating the status of a current alignment process and/or the results of a previous alignment process. Frequently, the monitoring occurs relative to a railway holding the track alignment machine. Also often, the monitoring occurs relative to a railway supporting the track alignment machine or an adjacent railway.

In certain embodiments, methods are provided comprising monitoring the status of a previous alignment process without passing the track alignment machine over the previously aligned railway. Often, a single reference system receiver is utilized to simultaneously monitor the progress of the current alignment process and the results of the previous alignment process.

In certain frequent embodiments, methods are provided for monitoring the status of a railway alignment process, comprising providing data communication between a reference projector and a reference system receiver using an infrared receiver IC, wherein the data comprises information about the status of an alignment procedure or information for making an alignment procedure decision.

BRIEF DESCRIPTION OF THE DRAWINGS

The skilled person in the art will understand that the drawings, described below, are for illustration purposes only.

DETAILED DESCRIPTION OF THE VARIOUS EMBODIMENTS

Figure 1:
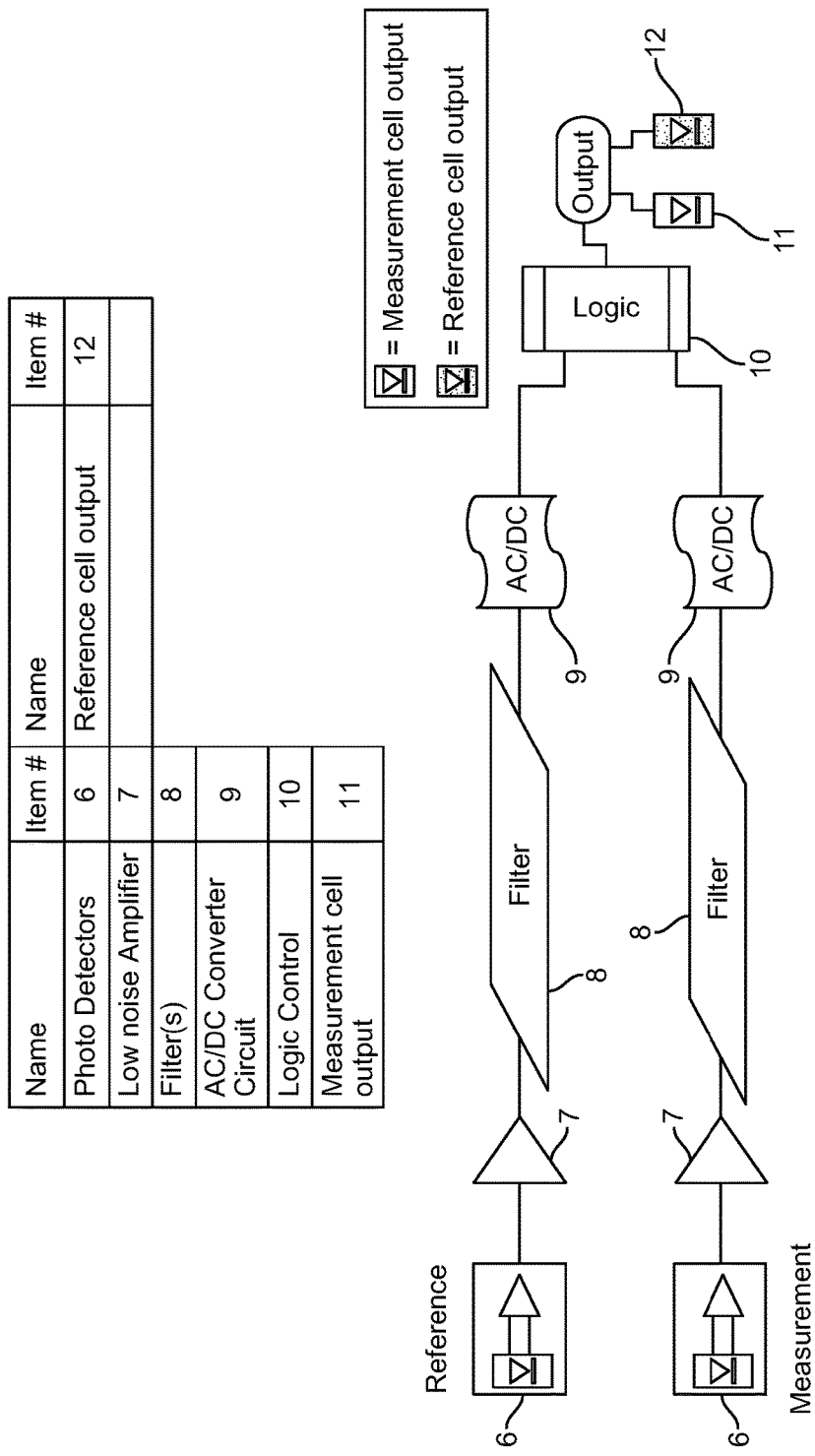
FIG. 1 depicts an exemplary circuit diagram of a receiver of the present disclosure.

For clarity of disclosure, and not by way of limitation, the detailed description of the various embodiments is divided into certain subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

As used herein, "tamping machine" or "ballast tamper" refers to a machine used to pack track ballast (e.g., gravel) under a railway tie or sleeper to support an elevation correction or to better support the loads imposed by a train. A "tamper-liner," "lining machine," or "tamping and lining machine" refers to a machine used to pack track ballast under a railway tie or sleeper to support an elevation correction or to better support the loads imposed by a train, and also correct the alignment of the rails to make them smoother and level in order to achieve a more comfortable ride for passengers and freight and to reduce the mechanical strain applied to the track structure by passing trains. Unless specifically indicated otherwise, each of the tamping-related terms and machines noted above is intended to fall within the scope of the term "track alignment machine" or "alignment machine," as used herein.

As used herein, "reference system" refers to a system designed to define a straight line (i.e., a "reference line") between two points in connection with the evaluation, positioning, or repositioning of the location of railroad track or its associated components such as ties, sleepers, or rail.

As used herein "reference cell" refers to an optical photo cell receiver assembly that monitors the presence of the reference system projector signal.

As used herein, "measurement cell" refers to an optical photo cell receiver assembly that measures the position of the shadow board shadow or light-mask light beam across its face.

As used herein, "optical signal receiver," "reference system receiver," and "receiver," are referred to interchangeably.

As used herein, "reference system projector" and "projector" are referred to interchangeably.

As used herein, "output" refers to a signal related to an electrical signal or lack thereof, including related pathways and hardware, transmitted between a receiver and a track alignment machine, typically a control or an operator. Output also refers to hardware components that permit the transmission of such a signals and/or data to an alignment machine control system.

Since the mid 1960's the reference systems utilized in connection with railroad track alignment machines have been generally comprised of three components: receiver, projector, and shadowboard, each mounted an approximate equal and/or controllable distance from the rail being measured. This system is generally used in lieu of the historic manual 62 ft. cord method for curvature measurement. The projector transmits a signal that is received by the receiver. Typically this signal has been a visible light signal. The arrangement of each of the reference system components provides a straight line of sight or a reference line to which the position of the rail can be compared. By moving one or more of the components, e.g., the shadowboard or the receiver, the system can move along the track and "feel" or measure a series of locations that can be interpreted as track position. The track alignment machine can then calculate how much track movement is required and physically move the track to an improved position or return the track to its new or intended position (e.g., straight, curved, etc.).

There are three general types of reference systems in use today. Two employ optical systems and one relies on a more basic mechanical means: (1) shadow board reference system, (2) light-mask reference system, and (3) Wire reference system.

The shadow board reference system is an optical reference system that employs a shadow board to cast a shadow line across the reference system receiver photo cell. The reference system receiver may employ one (1) or two (2) photo cells. In all cases the position indicator is measured across a single photo cell. The reference system projector in these systems utilize a modulated light source, typically operating with a frequency of about 500 Hz and about 1,200 Hz at an about 50% duty cycle.

The light-mask reference system is another optical-based reference system that employs a masking board with a slot cut through it to enable a light beam or light bar to pass through the masking board and illuminate the face of the reference system receiver photo cells. The reference system receiver used with this system utilizes a linear array of photo cells to capture the light beam as it moves back and forth across the array with track movement. The reference system projector used in these systems utilizes high intensity incandescent bulbs similar to aircraft landing lights or high beam automotive headlights with no modulation.

The Wire reference system does not rely on optical systems. Rather, this system makes reference measurements based on a wire stretched tight across the surface of the track.

Shadow board reference systems utilize a receiver. Since about 1967 these receivers have generally been single photo cell systems employing amplification with basic output signal control. The receiver collects light transmitted from the projector toward the receiver. The single output signal from this receiver corresponds to the position of the shadow board (shadow) on the face of the photo cell. This output has only two states; "see light from the projector" or, "Don't see light from the projector." The "don't see light" status occurs when the shadow board has adequately covered the receiver photo cell. The receiver is referred to as being at "Cutoff" when the shadow from the shadow board has covered just enough of the receiver photo cell to "Cutoff" the light from the projector and the receiver photo cell is no longer able to see the projector. An improved receiver was later developed that employed two photo cells. In these two photo cell receivers, generally the first photo cell is referred to as the Measurement cell and is used to capture the positional status of the shadow board as described above. The second photo cell, referred to as the reference cell, is used to monitor the projector status and provide additional receiver control. Projector status here refers, for example, to the projector signal that is monitored to ensure it remains present and that light from the projector does not go out due to projector failure (Light bulb failure), blockage or interference (animals, machinery, personnel etc.), or any environmental conditions or changes such as snow, dust, and fog. However, the previous two photo cell receivers did not make this reference cell information available as an "output" to the system. In addition, with regard to the solution detailed herein, prior shadow board reference system receivers have not utilized a dedicated output signal, nor a bi-state (Two color) status indicator to identify whether or not the light source (projector) is visible to the receiver (i.e., Status of the reference cell). Therefore, prior receivers have been unable to notify the track alignment machine of this failure, thereby failing to prevent unwanted track movement or recording during periods of time when the projector signal was not present.

As indicated herein, in a typical prior lining application, a receiver communicates with a track alignment machine control or operator, one of two statuses: (1) it sees the light (not at cutoff yet); or (2) it does not see the light (at or beyond cutoff). When the track alignment machine is in a work or correction mode, if the operator initiates a tamping and lining cycle to correct a track position, the machine will move the track outwards toward the (control rail) receiver at any time the receiver output is in the "see light" condition. The track alignment machine continues to move the track until a "cutoff" is reached and the receiver output goes to the "no-see" condition. If the receiver output is already in the "no see" condition, then the machine will move the track in the opposite direction until the cutoff position is crossed in the opposite direction. At which time, the movement will reverse until the cutoff is crossed from the "see light" condition. This ensures that track position is established upon reaching cutoff from only the "see light" condition. At this point track movement is stopped by the control system. Depending on the state of "see" or "no see," the track is always moved one way or another until the cut off position is reached. Therefore, a "see light" signal has traditionally resulted in movement of rail in the direction of the projector signal, until a cutoff is reached. In contrast, a "no see" light signal has traditionally resulted in movement of rail away from the direction of the projector signal until a "see light" condition is reached. When the "see light" condition is reached, the direction is then reversed to move once again back into the beam until cutoff is reached.

Projector for Shadow Board System:

Historically the reference system projector used with the shadow board reference system uses a single modulated incandescent light source. These projectors use, for example, an A/C or D/C motor and a rotating chopper disk to modulate the emitted light and direct it back toward the shadow board and reference system receiver through an optical lens. The standard reference system projector uses a frequency of between about 500 Hz and about 1,300 Hz, modulated at about a 50% duty cycle for the majority of shadow board reference systems. To date, both the about 500 Hz and 1,200 Hz frequencies are in use in connection with the shadow board reference system. This frequency is not desirable, for example, as it requires extremely long period times which can result in excessive heat buildup within the LED light source.

Shadow Board for Shadow Board Reference System:

The reference system shadow board is a solid panel that blocks light emitted from the reference system projector and keeps it from reaching the reference system receiver. The shadow board's position is controlled and its movement is measured as a way to determine the point at which the edge of the reference system shadow board interrupts the light being received by the reference system receiver. To effect movement, shadow boards are frequently connected with an electrical actuator featuring a screw-drive, for example, type movement and a potentiometer that relays an electrical signal to the track alignment machine defining position. In a typical embodiment, the main system controller moves the shadow board as needed to hunt the projector light beam, or change positions, or the operator can move the shadow board with a manual switch. In each of these cases, the shadow board is generally connected to a mechanical counter or electric interface so that the operator and computer "knows" its position. Often an electrical output or feedback from the receiver provides the signal to tell the system or computer when a cutoff has occurred. Surface systems operate similarly. For example, an electrical actuator often raises or lowers a receiver or shadow board, and electrical feedback from the actuator provides the signal to the computer, communicating a movement indication. Importantly, the shadow board movement determines the extent of, or actual track, movement required. The reference system determines when the reference line has been crossed, and when cutoff occurs.

The reference system shadow board casts a shadow line across the face of the reference system receiver (due to the light emitted from the projector contacting the board) as the edge of the reference system shadow board is moved in relation to the track position, or the receiver is moved in relation to the shadow board. Lining applications generally use a reference system shadow board that moves left and right (creating a vertical shadow line), where the movement and position of the reference system shadow board corresponds to horizontal track position. Surfacing applications often use a reference system shadow board that moves up and down representing the same track movement in the vertical direction, while other Surfacing applications will use a fixed or static reference board and a moving receiver corresponding to the same vertical track movement.

Receiver for Light-Mask Reference System:

The reference system receiver used on a light-mask reference system employs a photo cell array to capture the movement of a light beam passing through the reference system light-mask board. The linear array of photo cells and control logic enable a dynamic output signal that corresponds to the position of the light beam on the surface of the array. This system does not rely on a modulated light signal from the reference system projector to discriminate between the desired signal and undesired signals occurring in nature or as a result of reflections from other light sources. Instead, this system relies on high intensity light from the reference system projector to establish a "high" or "see light" threshold on the photo cell that is of sufficient magnitude to overcome most undesired signals. Therefore such conventional reference system receivers could still become susceptible to interference from any high intensity light source. For example, any bright modulated or unmodulated light source in the field of view could trigger this interference in a conventional receiver. As such, because there is a lack of modulation detection and a lack of discrimination between incoming signals other than light intensity in conventional systems, an high intensity signal (e.g., the sun, reflections, car headlights, or other undesirable high intensity light sources including high intensity sources with modulation) could interfere with the light-mask system and the track position in a conventional system.

Projector for Light-Mask Reference System:

The reference system projector used on light-mask reference systems is generally one or more high intensity incandescent white light bulbs. Generally, in a surfacing application, an array of three high intensity lights on each side of the machine is used. In lining applications, a single high intensity incandescent bulb is generally used. These bulbs are not intentionally modulated in any way and frequency response is not a design feature of this type of system. One of the various problems with this type of system is the use of very high intensity lights, which interfere with the sight of the track alignment machine operator and give rise to related consequential safety hazards, especially at night. It is an object of the present disclosure to provide an improved receiver such that a single modulated light source (i.e., projector) can be used. More specifically, the same projector can be used, according to the presently described methods and devices, for both a shadow board system and a light-mask system. For example, a modulation frequency of the projector, according to these methods and devices, is often set along with other features described herein, e.g., supporting $2^{nd}$-$30^{th}$ Harmonic of 1200 Hz.

Light-mask board for light-mask reference system: The light-mask board used on light-mask reference systems performs a similar function as the shadow board on the shadow board reference system, except that the light-mask board uses a solid panel with a slot cut into it to block light from the reference system receiver except in the desired location. The slot is cut into the light-mask board, permitting a defined light beam or light bar to project onto the surface of the reference system receiver photo cell array. As either the reference system light mask board or reference system light mask receiver is moved, the resulting light beam or light bar will also move across the surface of the reference system receiver.

Some of the drawbacks of existing systems include that the shadow board reference systems offer no ability to detect or communicate the condition of the reference photo cell to the track alignment machine, and do not provide this information as an output. Without this information, the track alignment machine will improperly move the track if or when there is a projector failure or blockage. The addition of the measurement cell output signal enables the track alignment machine to stop the tamping or graphing process if/when the projector signal is not present due to either projector equipment failure or blockage from equipment or personnel. The ability to stop the machine process can prevent damage to the machine itself, damage to the track alignment or position, and reduce safety concerns if in fact an obstruction is present between the reference system projector and the reference system receiver.

The shadow board reference system and light-mask reference system receivers are generally designed to optimally receive fixed modulation frequencies or no modulation at all. With all reference system receivers on a single machine being required to use the same modulation frequencies or the absences of modulation, an increased chance of interference between reference systems is present (e.g., the surfacing projector interfering with the lining receiver, or interference from projectors of a machine operating on adjacent track). These interference conditions can, for example, lead to track misalignment requiring additional tamping machine effort and time to correct (the longer it takes to realize the interference, the longer the correction time that will be required). Utilizing different modulation and/or encoding schemes between reference systems, for example as described herein, provides isolation between these systems for a significantly reduced potential for interference and a reduced likelihood of track misalignment.

Current shadow board reference systems do not provide sufficient visual status indicators on the receiver housing to confirm system operation or actual operating status. The addition of a reference cell status indicator and/or bi-color/multi-color two state indicators for all outputs, as described herein, provides direct feedback to the operator representing any/all conditions of the receiver. Such indicators greatly enhance the ability of the operator to troubleshoot system failures and minimize operational down time due to such failures.

Conventional reference systems are designed to monitor and measure only a single primary reference line. The addition of multiple reference and measurement photo cells provides the potential to measure additional machine or track position information, including the measurement of fixed track-side reference points to enhance overall track alignment capability and efficiency of the track alignment machine.

Conventional light-mask reference systems rely on a non-modulated very high intensity white light source which can be irritating to the machine operator and pose a safety hazard especially at night when visibility is already limited. By creating a light-mask receiver designed to utilize a modulated projector signal, the light-mask reference system and the shadow board reference system of the present disclosure can utilize a common reference system projector. The use of a common projector, for example, lowers overall system design costs through greater utilization of the single projector design and improves operator safety and comfort on existing light-mask systems.

The presently described systems provide an optical reference system with enhanced functionality and usability with a refined and expanded electrical and mechanical design.

The present reference system includes multiple output signals corresponding to the reference cell status on a reference system receiver using a shadow board. In frequent embodiments, an output is included in the receiver that provides the communication of reference cell status to a track alignment machine control system. In certain embodiments, this output communicates with the control system of a track alignment machine to indicate when the projector is not visible or not functional, and thereby avoid continuing to move track while in this "no see" condition and preventing unwanted or incorrect track movement.

In certain embodiments, output information is formatted as a single logic line, multiple data lines comprising a data buss, data transmission system such as USB, or as an analog voltage or constant current loop (e.g., a 4-20 mA system) enabling dynamic feedback of shadow board or light-mask board position. This type of output permits the notification of the track alignment machine of, for example, a reference system projector failure and/or to permit a track alignment machine to safely stop operations. Ceasing operations of the tamping machine halts further resulting track movement after the reference system receiver determines that the projector signal is not detected through the described reference cell output of the reference system receiver.

To date, shadow board type reference systems have only provided a single output corresponding the state of light on the photo cell (i.e., Single photo cell or Measurement photo cell in a dual cell receiver). If the projector is damaged or the light blocked for any reason, the track alignment machine will be unaware of this failure mode and attempt to continue the tamping/lining cycle and track movement, or graphing activity. Only when the track movement becomes visually excessive or the graphing or track measuring becomes completely out of scale will the operator know there is an issue.

The present disclosure provides an improvement on known technologies in several respects. For example, the present system provides the ability to support n number of desired frequencies within the reference system receiver. In one embodiment, n number of filter sections are provided in a receiver to receive one or more frequencies through a common photo cell, and common control logic system. In various embodiments, n stands for any number of frequencies between 1,200 Hz to about 60 kHz. Often, n stands for a single frequency such as 24 kHz. The inventors have discovered that supporting multiple frequencies permits the system to receive multiple frequency signals from a single common reference system projector. Moreover, the inventors have discovered that supporting multiple frequencies permits the system to receive signals at about 1,200 Hz in addition to frequencies such as 24 KHz (among other frequencies), as disclosed herein. Certain presently described embodiments of the present system are capable of receiving signals ranging over 1,200 Hz up to about 60 kHz. In certain related embodiments, a common reference system projector is utilized. When paired with a projector with similar capabilities, in certain embodiments, the ability to selectively control the modulation and encoding rates to provide for isolation between reference systems operating on the same track alignment machine, or on track alignment machines operating on adjacent track is provided, for example, by selecting a different modulation and/or encoding rate for each reference system.

The present disclosure also provides reference system receivers that receive frequencies within the range of between the $2^{nd}$ and $50^{th}$ harmonic of 1,200 Hz. In certain embodiments, the reference system receiver receives frequencies between the $2^{nd}$ harmonic (2,400 Hz) and the $50^{th}$ harmonic (60,000 Hz), while the reference system projector utilizes an LED (for example) as a light source. The inventors have discovered that increasing the emission signal frequency reduces the period time and the amount of time the reference system projector LEDs must remain in the "on" state. As used herein, period time refers to the time it takes for a signal to complete one on-and-off cycle (e.g., a duty cycle). Higher frequencies reduce the on-time within each cycle, which reduces the peak thermal load of the LED based projector during each cycle. In this regard, the inventors observe that LED's become increasingly hotter during each time period that they are powered up (i.e., "on"). Heat, in turn, is an important cause of premature failure of high power LED's. Therefore, according to the present disclosure, as a duty cycle remains constant (e.g., 50%), and the frequency of the signal increases, the period likewise decreases thus reducing the "on-time" of the LED used in an LED based projector. Reducing reference system projector thermal loads created inside the LED permits, for example, LEDs to meet recommended thermal limits, and/or provides for higher signal output levels at a given operating frequency. In addition, the inventors have discovered that increasing frequency also reduces the likelihood of natural occurrences such as reflections from moving objects (e.g., leaves, cars, equipment on the track, etc.) or safety strobe lights, from creating a false signal within the receiver.

Certain examples of Period time vs. Frequency (~50% duty cycle) contemplated herein include:
    a. 1,200 Hz—Period time is 833 µs.
    b. $2^{nd}$ harmonic, 2400 Hz—Period time is 416 µs.
    c. $20^{th}$ harmonic, 24000 Hz—Period time is 41.6 µs.
    d. $30^{th}$ harmonic, 36,000 Hz—Period time is 27.7 µs.
    e. $50^{th}$ harmonic, 60,000 Hz—Period time is 16.6 µs.

These frequencies, for example, improve thermal performance of LED-based reference system projectors by reducing the LED on-time by a factor of between 2 and 50. Existing systems continue to use a 1,200 Hz frequency where the LED on-time is extremely long at 833 µs. This on-time, the inventors have found, leads to projector overheating and reduced operational lifetimes.

The present disclosure also provides the use of Infrared receiver IC technology to replace one or more of the n number detectors and/or filter sections noted above within a reference system receiver. Infrared receiver IC's are commercially available and provide the ability to significantly reduce circuit size and complexity, and to provide for the ability to demodulate higher order modulation commands when transmitted between the reference system projector and the reference system receiver. In particular, Infrared receiver IC's enable demodulation of encoded optical signals such as biphase/manchester encoding, amplitude-shift keying, and pulse position modulation. Modulation standards employed include modulations capable of transmitting data, including but not limited to RC-5, RC-6, REC-8-, NEC, Sharp ASK, and TV Remote, among others. These modulation techniques can be used to achieve heretofore an unknown remote data communication path between projector and receiver including the transmission of track position information (From the projector buggy, the forward most part of the track alignment machine, located approximately 60-100 ft. in front of the track alignment machine) regarding data collected from other track measuring systems, devices, & sensors with the intention to collect track position information relative to fixed track side reference points, and extended distance measurement systems. Enhanced modulation also, for example, permits the ability to isolate reference systems operating on the same track alignment machine, or on track alignment machines operating on adjacent track by selecting a different modulation and/or encoding rate for each reference system.

The present disclosure also provides a complete reference system receiver comprised of only Infrared receiver IC's to permit the reference system functionality. Such reference system receivers, when combined with a suitably capable reference system projector, provide a means to communicate data between the reference system projector and the reference system receiver; although the transfer of data (beyond shadow board or light-mask board location) is not required. Such reference system receivers are smaller, with a greater ability to discriminate between modulated projector signals, and can be lower cost than existing receivers. In certain embodiments, these modulation techniques are used to communicate data between the reference system projector and the reference system receiver. Enhanced modulation and the ability to selectively control the modulation, demodulation, and/or encoding rates also provides the ability to isolate reference systems operating on the same track alignment machine, or on track alignment machines operating on adjacent track by selecting a different modulation and/or encoding rate for each reference system. Infrared receiver IC's also, for example, provide similar thermal benefits to LED-based reference system projector design in terms of decreased LED "On-Time" to improve thermal management of the LED.

The present disclosure also provides the addition of multiple reference and/or measurement photo cells within the reference system receiver that may be employed to capture additional track or machine positioning information, or to monitor and collect data from track side reference points. In one embodiment, multiple reference cells and/or multiple measurement cells are provided including outputs as defined herein above.

In certain embodiments, the receiver architecture includes discrete receiver components or the use of infrared receiver IC's as described above. This provides the operation of a second or third set of reference & measurement photo cells. In particular, while a direct pairing of reference & measurement photo cells are described, such pairing is not required to retain the pair relationship of these photo cells. As such, as contemplated herein, any multiples of reference cells, or multiples of measurement cells may be used separately or in combination with any number of other cells.

The present disclosure also provides the application of the above embodiments to the light-mask reference system receiver photo cell array, using modulated signals instead of a constant high intensity light. As discovered by the inventors, the reception of a modulated signal provides for the use of a common LED reference system projector for both the light-mask reference system and the shadow board reference system. The use of an IR LED reference system projector, for example, also improves operator safety by removing the visual impairment of the current constant high intensity light. In addition, the modulated signal also provides for a data communication path between the reference system projector and the reference system receiver (as noted herein), and the ability to selectively control the isolation between reference systems operating on the same track alignment machine, or on machines operating on adjacent track via selection of different frequencies and/or encoding rates.

The present disclosure also in certain embodiments, employs a visual multi-color output indicator positioned, for example, on the reference system receiver housing that represents the output status of reference photo cell(s), measurement cell(s), and/or combined photo cell array.

With reference to FIG. 1, this provides a circuit diagram of a receiver of the present disclosure. A reference photodetector (6) and a measurement photodetector (6) are operably connected to a logic control (10) though amplifiers (7) (e.g., low rise), filters (8), and AC/DC Converter Circuits (9). The logic control (10) is, in turn, operably connected with a measurement cell output (11) and a reference cell output (12). The second output for the reference cell provides for communication with the track alignment machine to notify and stop operations when the signal from the projector is not being detected. Output information may be formatted as a single logic line, multiple data lines comprising a data bus, data transmission systems such as USB, other data transmission systems known in the art, or communicated over a constant current loop such as 4-20 mA systems.

Figure 2:
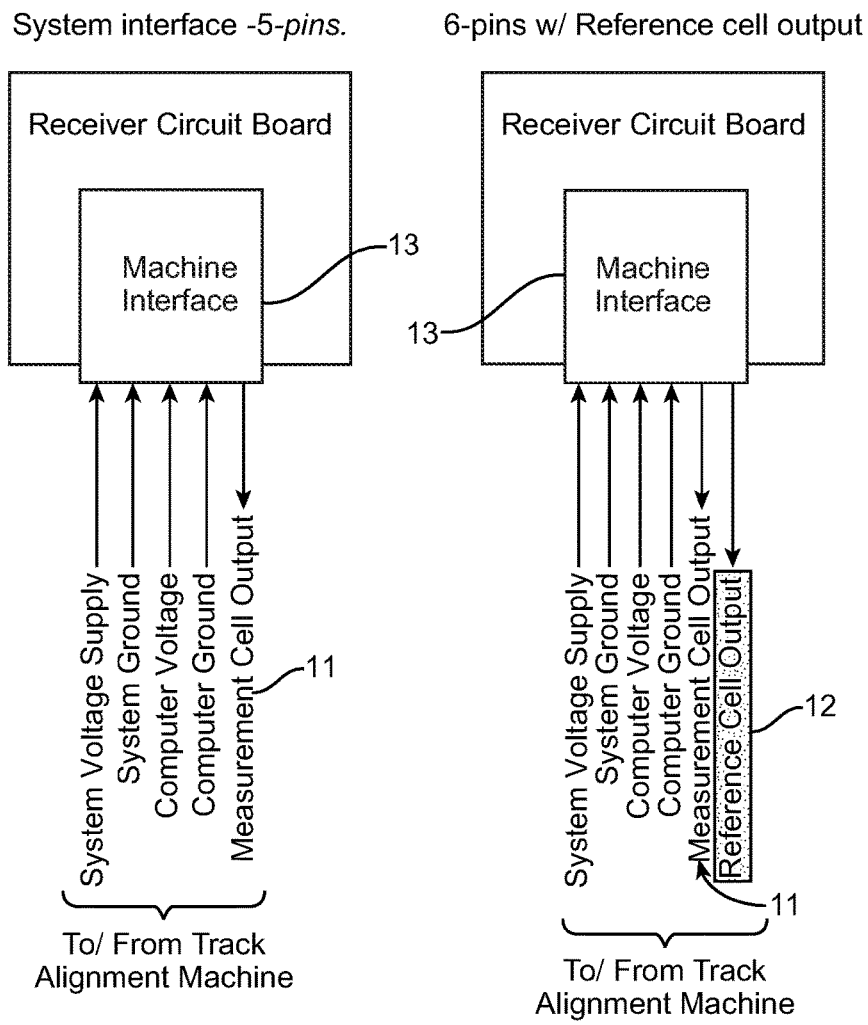
FIG. 2 depicts an overview of a receiver circuit board for the machine interface connector.

With reference to FIG. 2, this provides an overview of a receiver circuit board for the machine interface (13). A reference cell output (12) is provided to/from the track alignment machine, providing a $6^{th}$ pin versus existing 5-pin systems. Existing systems, as observed in FIG. 2, do not communicate reference cell information to/from the track alignment machine.

Figure 3:
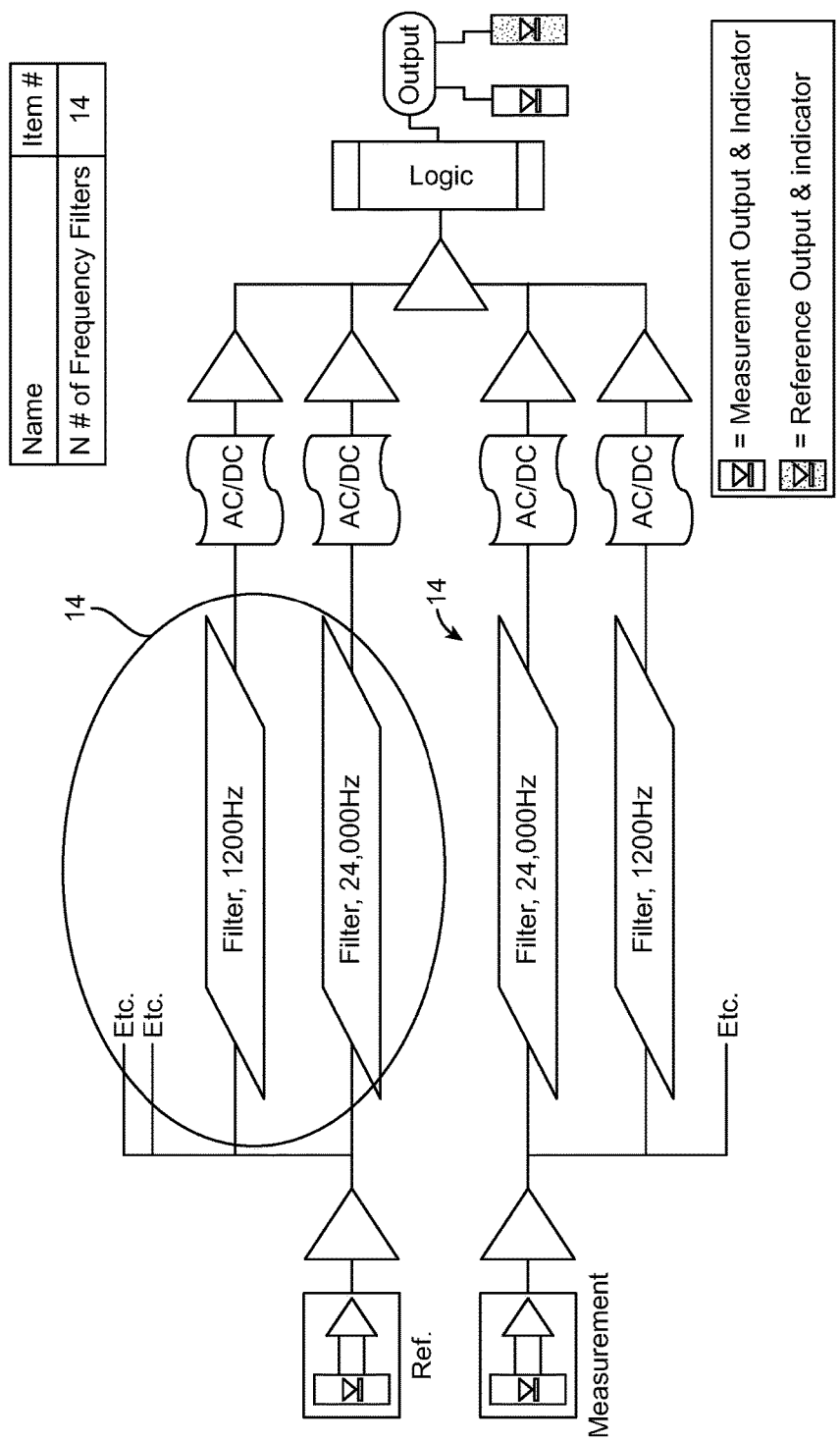
FIG. 3 depicts an exemplary circuit diagram of an embodiment of the present disclosure.

With reference to FIG. 3, this provides an exemplary circuit diagram of an embodiment of the present disclosure. In this embodiment a plurality (14) of filters (8) are operably connected, together with associated AC/DC Converter Circuits (9) and amplifiers (7), with each of the reference photodetector (6) and a measurement photodetector (6). All of these components are operably connected with a logic control (10), and a measurement output (11) and a reference output (12). Each of the plurality (14) of filters incorporates filters supporting different frequencies, with 1,200 Hz and 24,000 Hz filters specifically depicted. Additional filters are contemplated with any center frequency of between the $5^{th}$ and $30^{th}$ harmonics of 1,200 Hz (e.g., including one or more of 6000 Hz, 7200 Hz, 8400 Hz, 9600 Hz, 10,800 Hz, 12,000 Hz, 13,200 Hz, 14,400 Hz, 15,600 Hz, 16,800 Hz, 18,000 Hz, 19,200 Hz, 20,400 Hz, 21,600 Hz, 22,800 Hz, 24,000 Hz, 25,200 Hz, 26,400 Hz, 27,600 Hz, 28,800 Hz, 30,000 Hz, 31,200 Hz, 32,400 Hz, 33,600 Hz, 34,000 Hz, 36,000 Hz). In certain embodiments, the lowest bandpass filter supports 2,400 Hz, with additional filters are contemplated between the $5^{th}$ and $30^{th}$ harmonics of 1,200 Hz. In certain embodiments, the lowest bandpass filter supports 2,400 Hz, with additional filters are contemplated between the $5^{th}$ and $60^{th}$ harmonic (i.e., 72 kHz) of 1,200 Hz. Optionally, these embodiments are adapted to incorporate a 1200 Hz filter.

Figure 4:
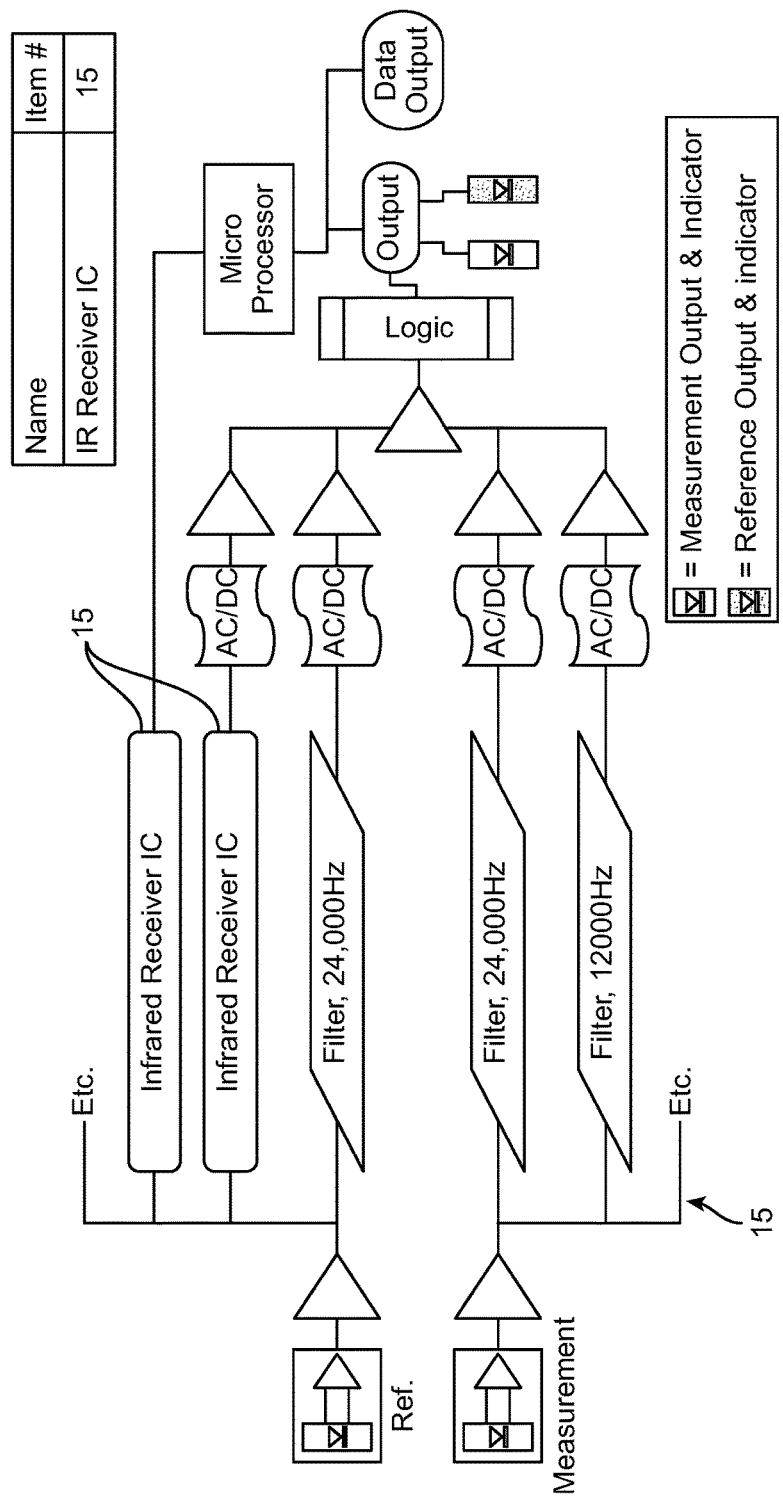
FIG. 4 depicts another circuit diagram of an embodiment of the present disclosure.

With reference to FIG. 4, this provides another circuit diagram of an embodiment of the present disclosure. This embodiment is similar to that presented in connection with FIG. 3, but incorporates demodulation of encoded optical signals and higher frequency support through infrared received IC technology (15). As indicated herein, modulation encoding provides, for example, a data communication path between the reference system projector and the reference system receiver when combined with a suitably capable reference system projector. Modulation standards employed include modulations capable of transmitting data, including but not limited to RC-5, RC-6, REC-8-, NEC, Sharp ASK, and TV Remote, among others. Infrared receivers are useable for the reception of basic modulation schemes (i.e., about 50% modulation) or higher order encoding schemes when combined with a suitably capable reference system projector to communicate data to the reference system receiver. Such data would bypass the typical logic circuits and be controlled by a microprocessor to capture the data and format it for output to the track alignment machine.

Figure 5:
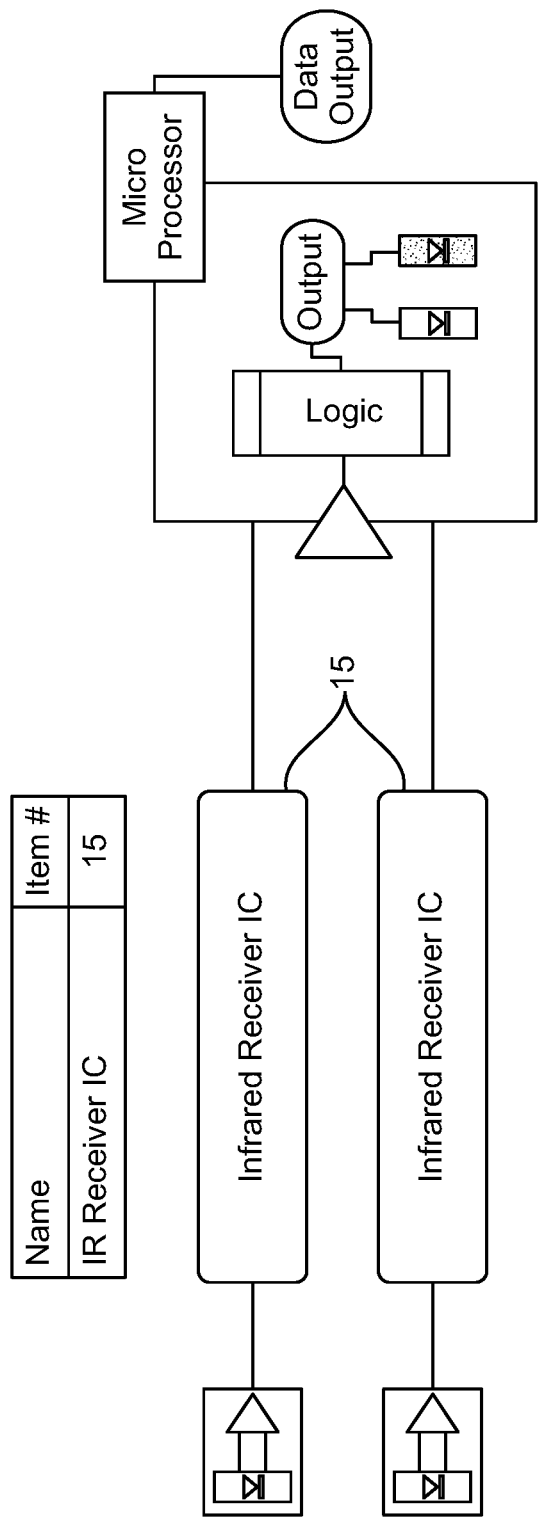
FIG. 5 depicts another circuit diagram of an embodiment of the present disclosure.

With reference to FIG. 5, this provides another circuit diagram of an embodiment of the present disclosure. This embodiment is similar to that presented in connection with FIG. 4, but replaces discrete optical receivers (e.g., filters, AC/DC converter circuits, and amplifiers) with an IR receiver IC (15) for each reference system receiver photo cell path. This arrangement provides for the ability to support data communication between the reference system projector and the reference system receiver when combined with a suitably capable reference system projector. Modulation standards employed include modulations capable of transmitting data, including but not limited to RC-5, RC-6, REC-8-, NEC, Sharp ASK, and TV Remote, among others. The use of IR receiver ICs also provides isolation between multiple reference systems used on the same track alignment machine through the selection of a different modulation frequency or encoding rate such as biphase/manchester encoding, amplitude-shift keying, and pulse position modulation for each reference system for enhanced system functionality.

Figure 6:
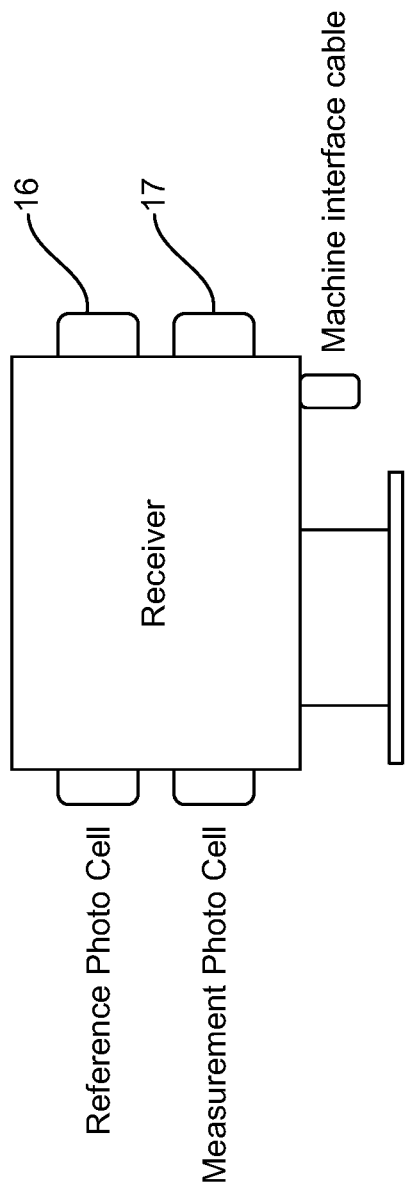
FIG. 6 depicts an embodiment is depicted having Multiple reference photo cells.

With reference to FIG. 6, an embodiment is depicted having multiple reference photo cells (16) and multiple Measurement photo cells (17) included with the associated optics to provide additional data collection (machine alignment, track alignment, etc.). This embodiment may make use, for example, of the aspects depicted and described in connection with at least FIGS. 1-5. Moreover, additional cells may be disposed to face the primary projector or in directions and at angles other than the primary reference system projector. Moreover, the addition of receiver cells to both sides of the receiver provides for the measurement of "Finished" track condition after the tamping process has completed. As such, this embodiment provides for immediate confirmation of the finished track condition without needing the entire track alignment machine to move back over the same track to re-measure the finished track condition.

Figure 7:
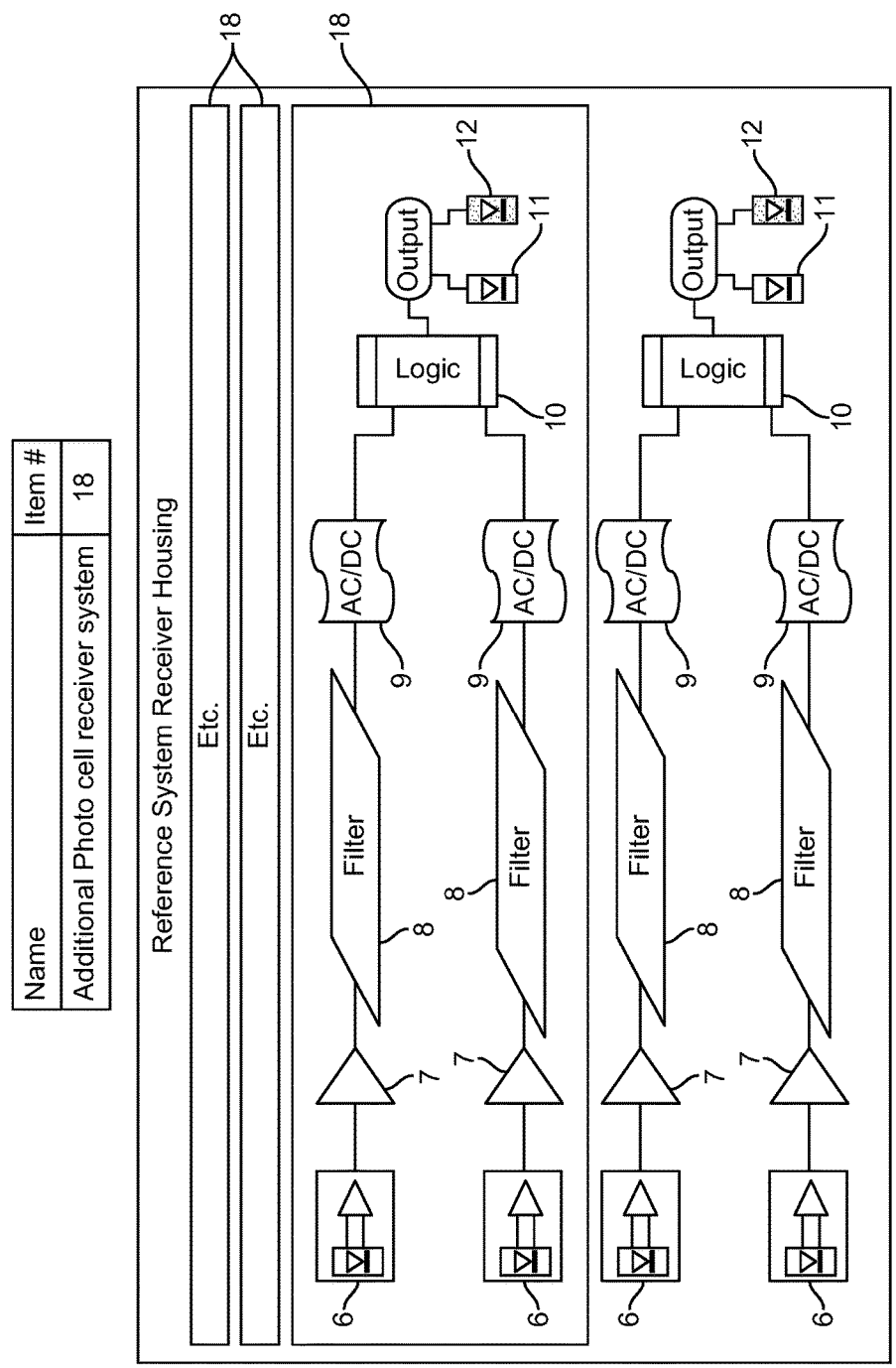
FIG. 7 depicts a block diagram illustrating the addition of multiple photo cell receiver systems within a single housing.

With reference to FIG. 7, a block diagram is provided, illustrating the addition of multiple photo cell receiver systems (18) within a single housing (the housing depicted as the border surrounding the components). A reference cell output prevents unwanted track movement due to, as explained further herein, insufficient information being output from the reference system receiver. And, output information may optionally be formatted as described herein, including as a single logic line, multiple data lines comprising a data buss, data transmission system such as USB, or communicated over a constant current loop similar to 4-20 mA systems.

Figure 8:
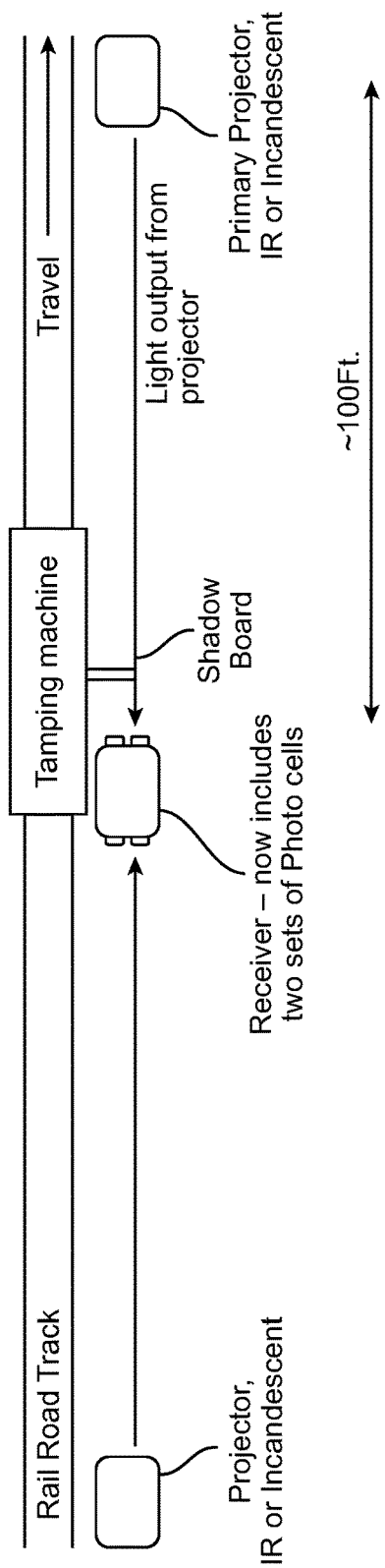
FIG. 8 depicts an exemplary operation of an embodiment having multiple reference photo cells.

With reference to FIG. 8, this depicts an exemplary operation of an embodiment of FIG. 6. As depicted, a second set of photo cells is added to measure additional track or maintenance of way details. In this example, a second set of photo cells is positioned to look in directions and angles separate from the bore sight angle of the primary reference system projector. This system is, for example, used to collect additional position data from the track. In this example the second set of photo cells are looking behind the track alignment machine and used, for example, to validate track condition after tamping and lining operations. Moreover, in certain embodiments, additional photo cells can be incorporated to face the track alignment machine itself, or the right of way to capture fixed track side reference points.

Figure 9:
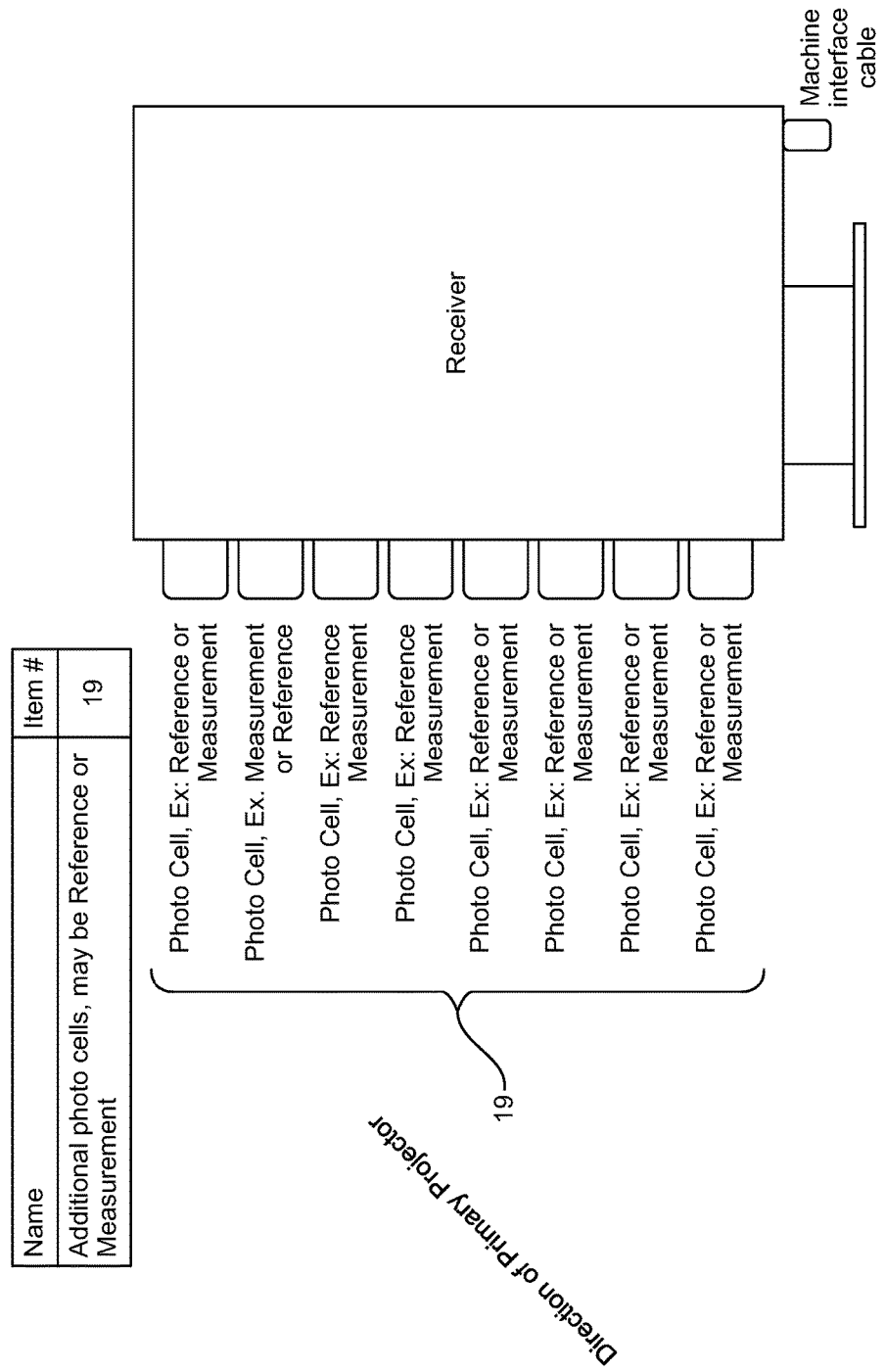
FIG. 9 depicts a reference system receiver with multiple reference photo cells and/or multiple Measurement photo cells placed in an array.

With reference to FIG. 9, this depicts a reference system receiver with multiple reference photo cells and/or multiple measurement photo cells placed in an array (19). Eight cells are illustrated, but any number of cells (including fewer or more photo cells) and any number of rows of photo cells may be incorporated within the spirit and scope of the present disclosure. Moreover, any combination of one or more reference cells together with one or more measurement cells may be employed. In one embodiment, one measurement cell is employed with a plurality of reference cells. In another embodiment, two measurement cells are employed with one or more reference cells. In another embodiment, two measurement cells are employed with two or more reference cells. In certain embodiments, each photo cell is optimized to detect a modulated light source within predetermined frequency ranges contemplated herein, for example those contemplated in connection with FIG. 3. In related embodiments, the array can be utilized in connection with a modulated projector light source and/or provide a common reference system projector for both types of optical reference systems. Each photo cell may include a separate output, or outputs of some or all photo cells are optionally electrically combined in such a way as to provide an electrical representation of shadow board or light-mask position. Output information may optionally be formatted as described herein, including as a single logic line, multiple data lines comprising a data buss, data transmission system such as USB, or communicated over a constant current loop similar to 4-20 mA systems. The use of frequency modulation permits, for example, the use of solid state reference receiver projectors employing IR LED's to eliminate bright-light irritation to an operator.

Figure 10:
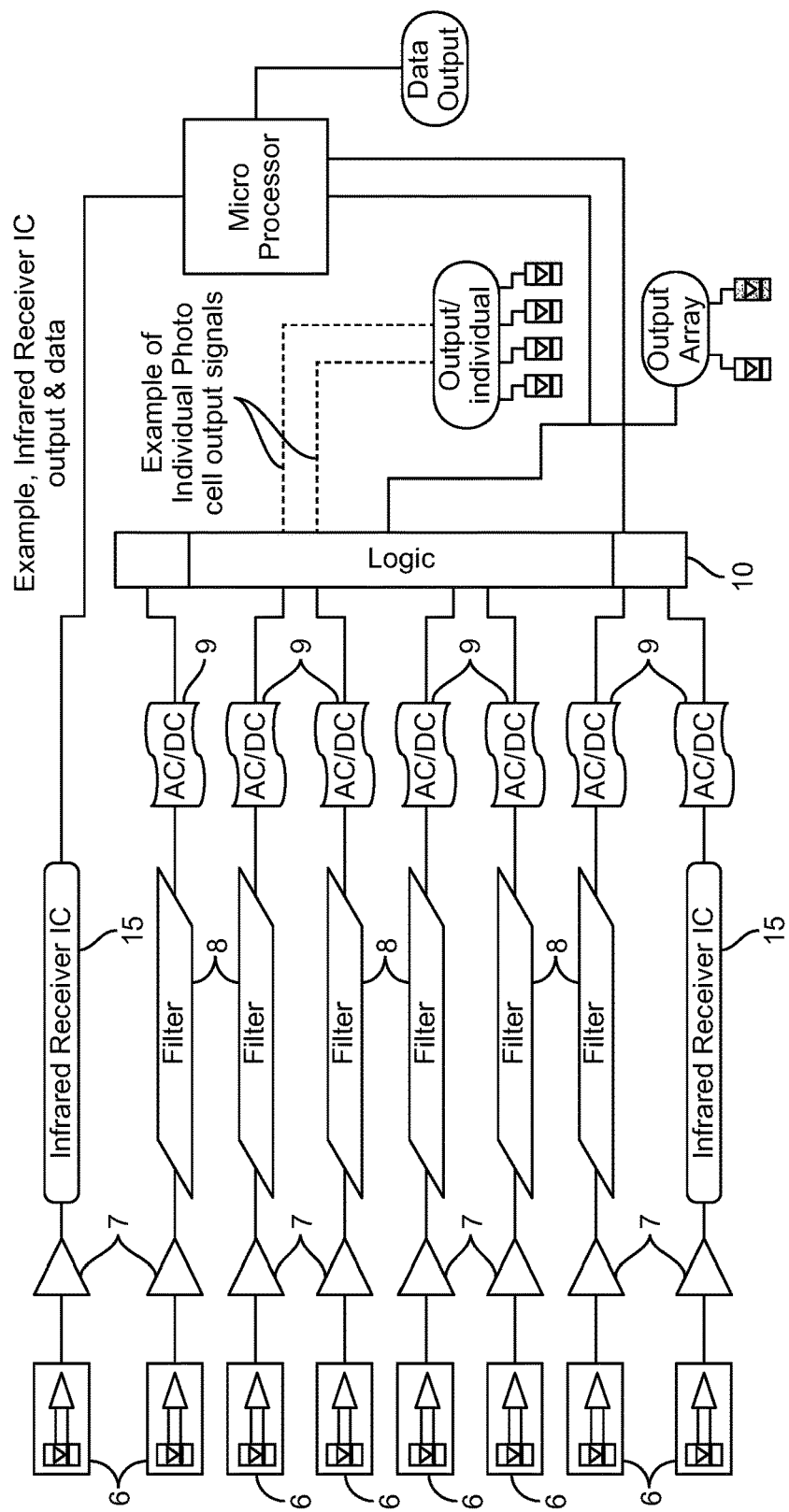
FIG. 10 depicts a block diagram is provided with circuitry that accepts a modulated input signal from the reference system projector.

With reference to FIG. 10, a block diagram is provided with circuitry that accepts a modulated input signal from the reference system projector. In certain embodiments, related embodiments only accept a modulated input signal. Multiple photo cell circuits are provided, feeding a logic control system with an output circuit representing the entire array.

Output information may optionally be formatted as described herein, including as a single logic line, multiple data lines comprising a data buss, data transmission system such as USB, or communicated over a constant current loop similar to common 4-20 mA systems. In addition, each photo cell receiver individually, or collectively as an array, can provide an output feeding directly to micro controller or output section. And, the receiver circuit may optionally employ either a discrete filter design or infrared receiver ICs in any one or all locations.

Figure 11:
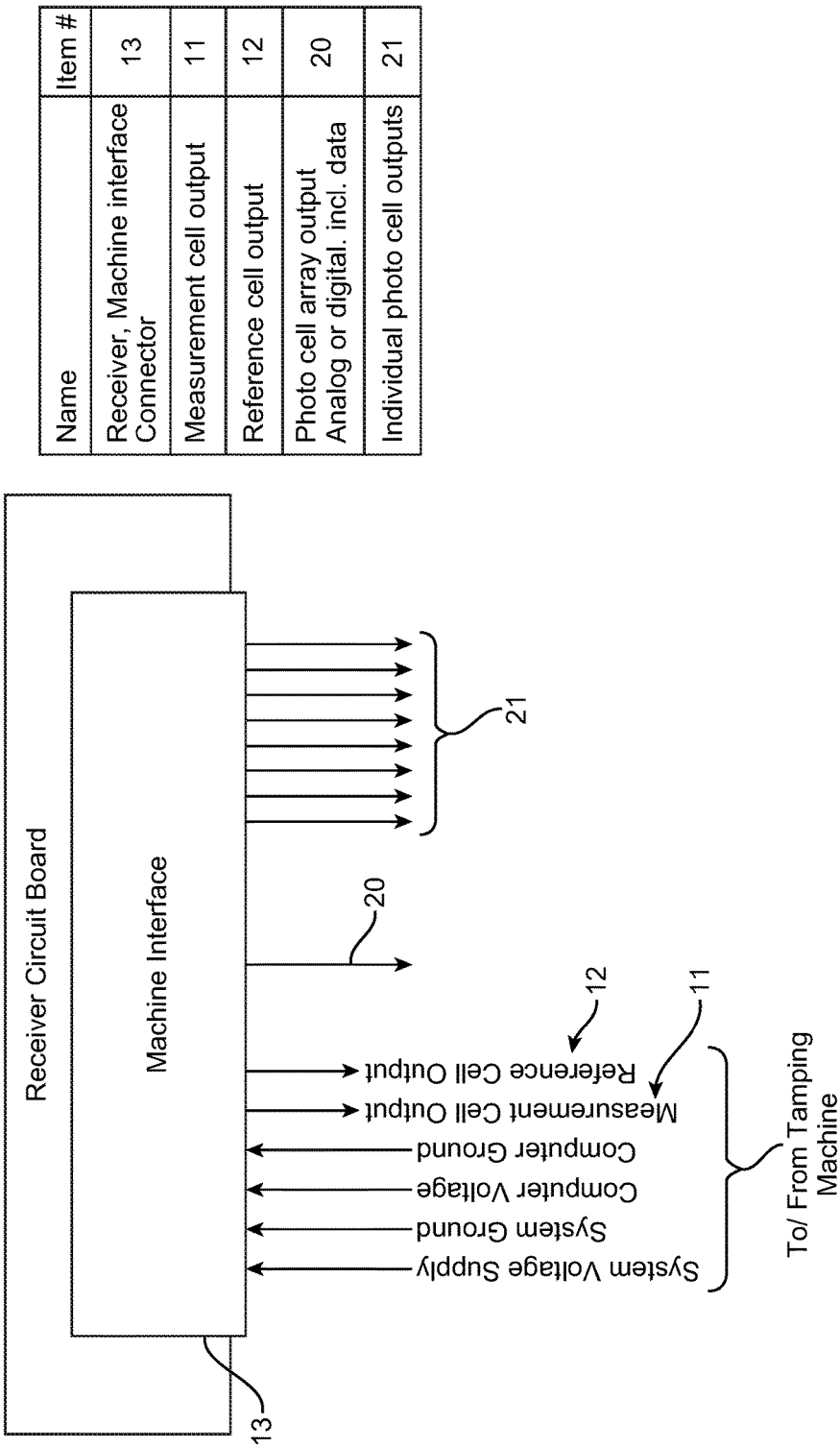
FIG. 11 depicts an overview of another receiver circuit board for the machine interface connector.

With reference to FIG. 11, this provides an overview of another receiver circuit board for the machine interface (13). The addition of multiple reference or Measurements cells is provided, for example, in an array. In certain embodiments, outputs (11, 12, 20, 21) represent an individual photo cell, multiple photo cells, or an entire array. Outputs formats may optionally be formatted as described herein, including a single logic line, multiple data lines comprising a data buss, data transmission system such as serial/parallel, USB, etc., or as an analog voltage or constant current loop similar to 4-20 mA systems.

Figure 12:
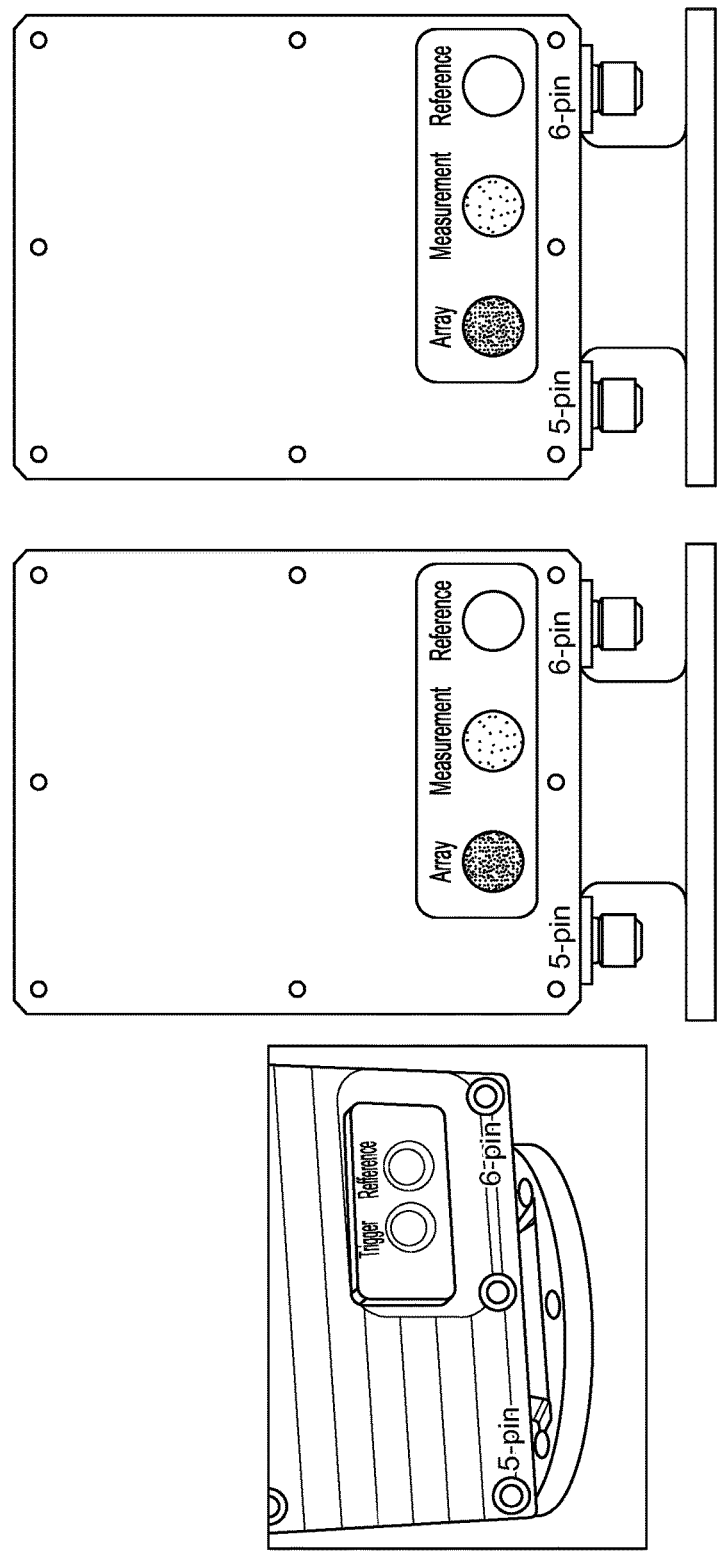
FIG. 12 depicts an exemplary device housing including the addition of external visual indicators.

With reference to FIG. 12, an exemplary device housing is depicted including the addition of external visual indicators for the array, measurement, and reference photo cells. While existing systems may provide a visual indicator for one output condition (see or don't see) for the Measurement cell, the current embodiment may be multi-color and/or multi-element indicators visible from the outside of the reference system receiver and that provide indication for both/all output conditions. These indicators provide, for example, status information (e.g., output status) related to each photo cell, pair of cells, or array of photo cells, including the measurement and reference cells. If colors are used, the color Green indicator often illustrates "see light" and the color Red indicator often illustrates "don't see light" for each cell, pair of cells, or array. Additional color variations, indicator shapes, and manners of indication are contemplated, without limitation.

Figure 13:
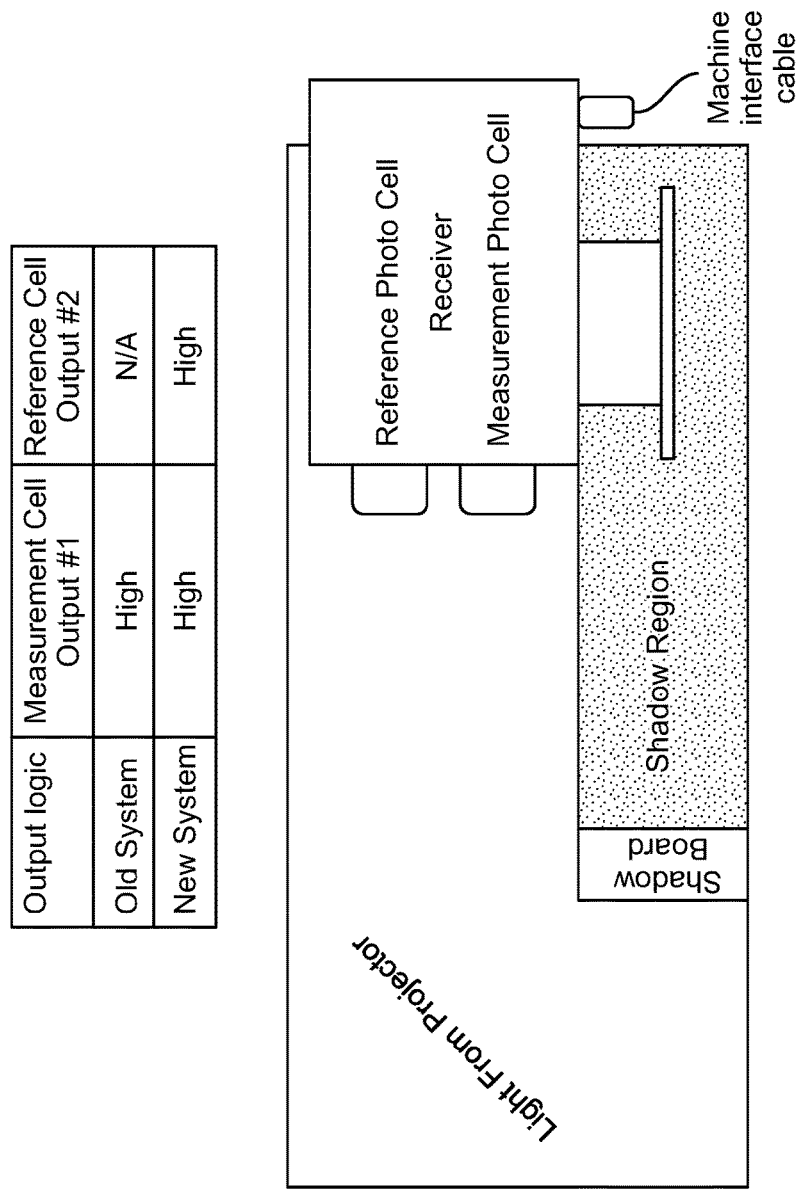
FIG. 13 depicts a shadow board system in operation.
Figure 17:
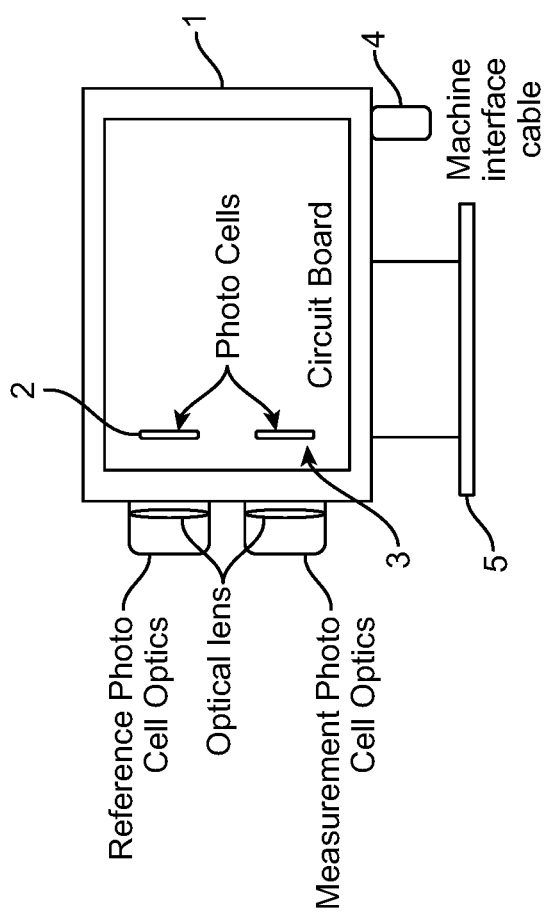
FIG. 17 depicts an exemplary receiver anatomy.

With reference to FIG. 13, a shadow board system in operation is illustrated. Two regions are illustrated—"light from projector" and "shadow region." The "shadow region" shows where the shadow from the shadow board is cast toward the receiver (see, e.g., FIG. 17 for a description of the anatomy of an exemplary receiver). For example, the shadow board moves up & down in these embodiments. As depicted, both cells "see light" from the projector. Existing systems having single outputs can only determine that the shadow board is too far down and will attempt to move the track (and shadow board) toward Measurement cell cutoff. The presently described systems, in similar circumstances confirm the system is ready to support track movement.

Figure 14:
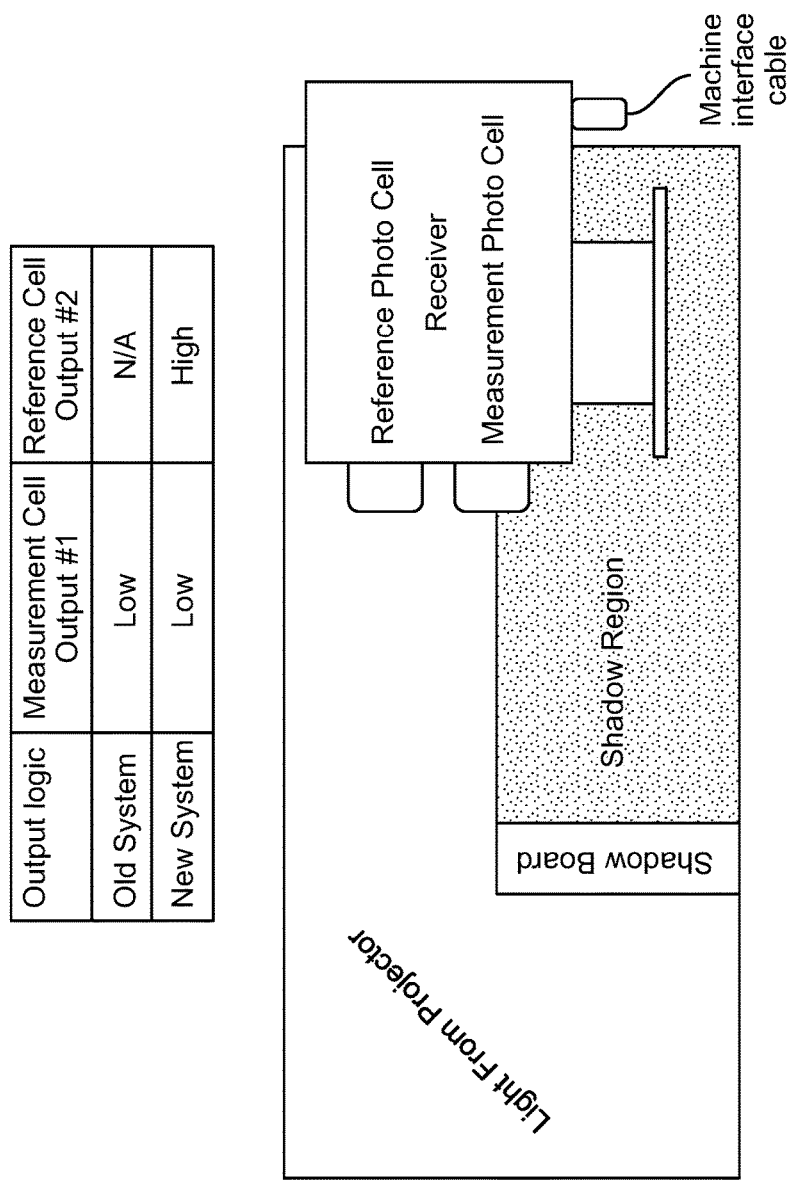
FIG. 14 depicts a shadow board system in operation.

With reference to FIG. 14, a shadow board system in operation is illustrated. Two regions are illustrated—"light from projector" and "shadow region." The "shadow region" shows where the shadow from the shadow board is cast toward the receiver. In this depiction, the shadow board has moved up and cut off light from entering the measurement cell, i.e., "no see." However, the reference cell continues to see light from the projector indicating the system is functioning as intended. In these circumstances, the track alignment machine will stop moving track because the Measurement cell is cutoff. In existing systems, the only available information would be that the Measurement cell is cutoff, and will consequently attempt to move the track away from the cutoff position, even if the test environment doesn't support track movement. The presently described embodiments, confirms there should be continued machine operation because the second output for the reference cell remains high (e.g., see light).

Figure 15:
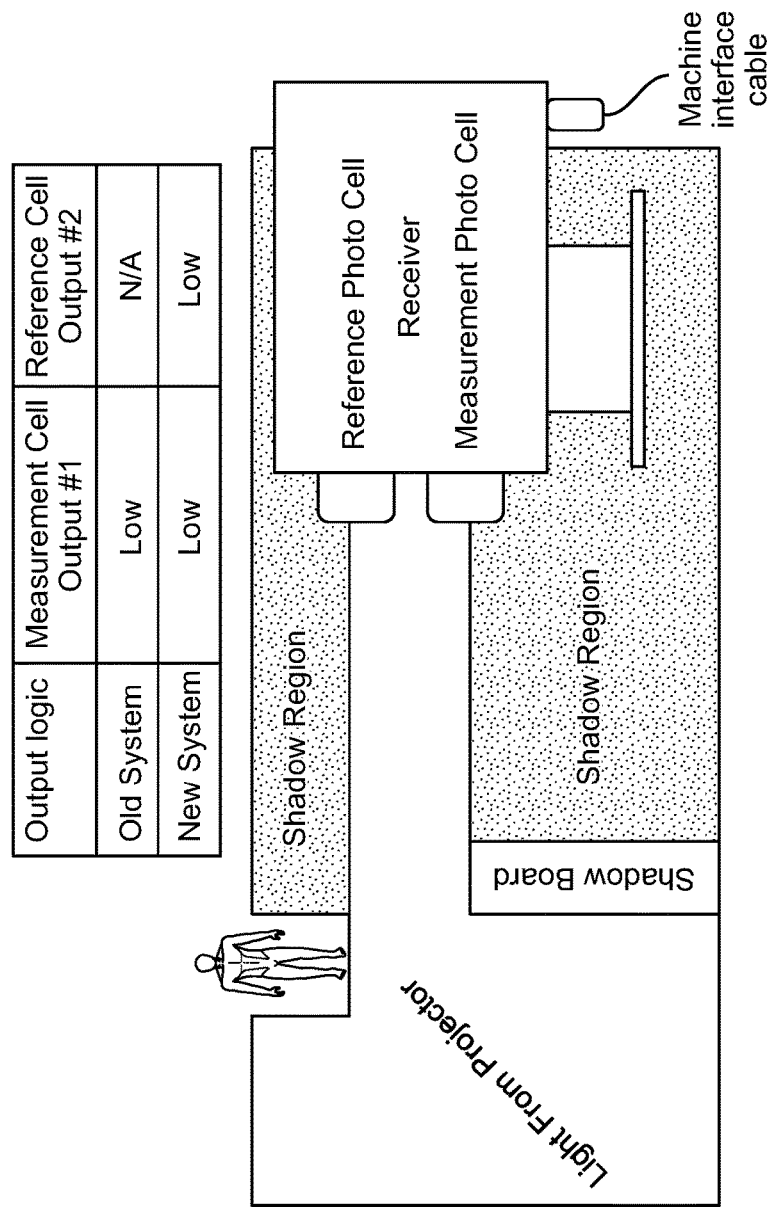
FIG. 15 depicts a shadow board system in operation.

With reference to FIG. 15, a shadow board system in operation is illustrated. Three regions are illustrated—"light from projector," and two "shadow regions." The bottom shadow region is due to the shadow board resulting in a cutoff "no see" condition on the measurement cell. The top shadow region is due to the presence of a blockage from a person between the projector and the receiver (any other source of the blockage is also contemplated such as machinery, projector failure, etc.) resulting in a cutoff "no see" condition on the reference cell. Because the reference cell is in the "no see" condition and the reference cell output is low the track alignment machine will "Stop work" and not move the track or continue to graph. Existing systems would not recognize this condition and can only tell the machine to move the track down, away from the cutoff position, having no idea there is a blockage preventing the reference cell from seeing the projector signal. Therefore, with existing systems, excessive and undesirable track movement is likely. The presently described systems recognize this circumstance as a system failure or gross miss-position of track. A "low" on reference cell output tells the machine that the projector is not working and not to move the track. This prevents unwanted track movement, reduces mistakes, and improves system efficiency.

Figure 16:
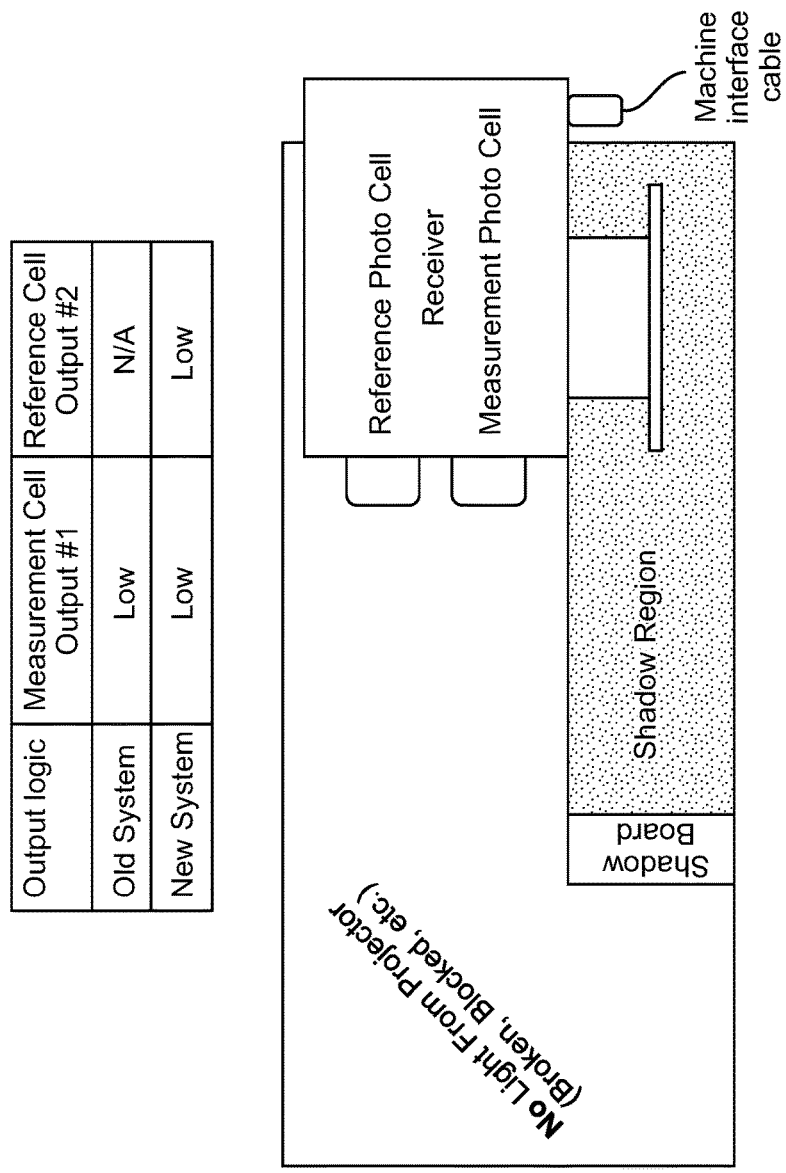
FIG. 16 depicts a shadow board system in operation.

With reference to FIG. 16, a shadow board system in operation is illustrated. In this embodiment there is no light from the projector despite the fact that the shadow board is fully retracted. This is the circumstance, for example, when a projector fails or is broken, or another type of interference occurs. Existing systems in this situation would simply confirm the reference cell is not seeing light and will default the single output to a "low" in this condition just as if the shadow board were already at the cutoff position. The machine may therefore attempt to move the track further down exacerbating track misalignment. This movement is unwanted and undesirable, for example, because it takes time and money to repair incorrect track position. The present systems, including a second reference cell output, will recognize this condition. A "low" on the reference Cell output tells the track alignment machine that the projector is not working and not to move the track. This prevents, for example, unwanted track movement, reduces mistakes, and improves system efficiency.

One skilled in the art will appreciate further features and advantages of the presently disclosed methods, systems and devices based on the above-described embodiments. Accordingly, the presently disclosed methods, systems and devices are not to be limited by what has been particularly shown and described, except as indicated by the appended claims. All publications and references cited herein are expressly incorporated herein by reference in their entirety.

We claim:

1. A track alignment reference system receiver, comprising two or more photodetectors and an optical signal demodulator operably connected with a measurement cell output and a reference cell output, wherein each photodetector is operably connected with an optical signal receiver,
    wherein the optical signal receiver comprises a discrete receiver elements including an amplifier, a filter, an AC/DC converter, logic and/or an infrared receiver IC, and wherein the optical signal receiver comprises a demodulation filter operating at a frequency of 2.4 kHz or higher, and the system further comprising a plurality of filters operably connected with either the reference photo cell and/or the measurement photo cell wherein each filter of the plurality of filters operates at a different frequency.

2. The track alignment reference system receiver of claim 1, wherein the two or more photo detectors comprise at least one reference photo cell and at least one measurement photo cell.

3. The track alignment reference system receiver of claim 1, wherein the reference cell output is operably connected with a track alignment machine such that a signal communicated from the reference cell output to the track alignment machine can stop an operation of the track alignment machine.

4. The track alignment reference system receiver of claim 3, further comprising a data output operably connected with the optical signal receiver.

5. The track alignment reference system receiver of claim 1, wherein the frequency is selected from a frequency between the 2nd and the 60th harmonic of 1.2 Hz.

6. The track alignment reference system receiver of claim 1, wherein the optical signal receiver comprises an infrared receiver IC capable of demodulating an optical signal of about 50% duty cycle.

7. The track alignment reference system receiver of claim 1, wherein the optical signal receiver comprises an infrared receiver IC capable of demodulating encoding schemes selected from the group consisting of biphase/manchester encoding, amplitude-shift keying, and pulse position modulation.

8. The track alignment reference system receiver of claim 1, wherein the optical signal receiver comprises an infrared receiver IC capable of demodulating an optical signal above about 50% duty cycle.

9. The track alignment reference system receiver of claim 1, wherein the optical signal receiver is positioned in a housing having a first side, a second side, a top, and a bottom, and wherein:
    two or more photodetectors are present, and wherein at least one photodetector is positioned on the first side of the housing, and at least one photodetector is positioned on the second side of the housing; or
    two or more photodetectors are present and positioned on the first side of the housing in an array.

10. The track alignment reference system receiver of claim 9, wherein two or more of the photodetectors comprise reference photo cells or measurement photo cells.

11. The track alignment reference system receiver of claim 1, wherein the measurement cell output and the reference cell output communicate output information formatted as a single logic line, multiple data lines, a data transmission system, or a constant current loop.

12. The track alignment reference system receiver of claim 1, wherein the receiver is in data communication with the rail alignment machine such that a status of an operation or operability of one or more components of the reference system receiver is transmitted to a control system of the rail alignment machine.

13. The track alignment reference system receiver of claim 1, further comprising a reference system projector, wherein the receiver and the projector are provided in data communication connection.

14. A track alignment reference system receiver, comprising two or more photodetectors and an optical signal demodulator operably connected with a measurement cell output and a reference cell output, wherein each photodetector is operably connected with an optical signal receiver,
    wherein the optical signal receiver comprises a discrete receiver elements including an amplifier, a filter, an AC/DC converter, logic and/or an infrared receiver IC, and wherein the optical signal receiver comprises a demodulation filter operating at a frequency of 2.4 kHz or higher, and
    the system further comprising a plurality of filters operably connected with either the reference photo cell and/or the measurement photo cell, wherein each filter of the plurality of filters operates at a different frequency and is operably connected with the reference photo cell, and/or the measurement photo cell.

15. A track alignment reference system receiver, comprising two or more photodetectors and an optical signal demodulator operably connected with a measurement cell output and a reference cell output, wherein each photodetector is operably connected with an optical signal receiver,
    wherein the optical signal receiver comprises a discrete receiver elements including an amplifier, a filter, an AC/DC converter, logic and/or an infrared receiver IC, and wherein the optical signal receiver comprises a demodulation filter operating at a frequency of 2.4 kHz or higher, and
    the system further comprising a plurality of filters operably connected with either the reference photo cell and/or the measurement photo cell, wherein one or more filter of the plurality of filters operates at two or more different frequencies and is operably connected with the reference photo cell and/or the measurement photo cell.

* * * * *